Patented June 29, 1926.

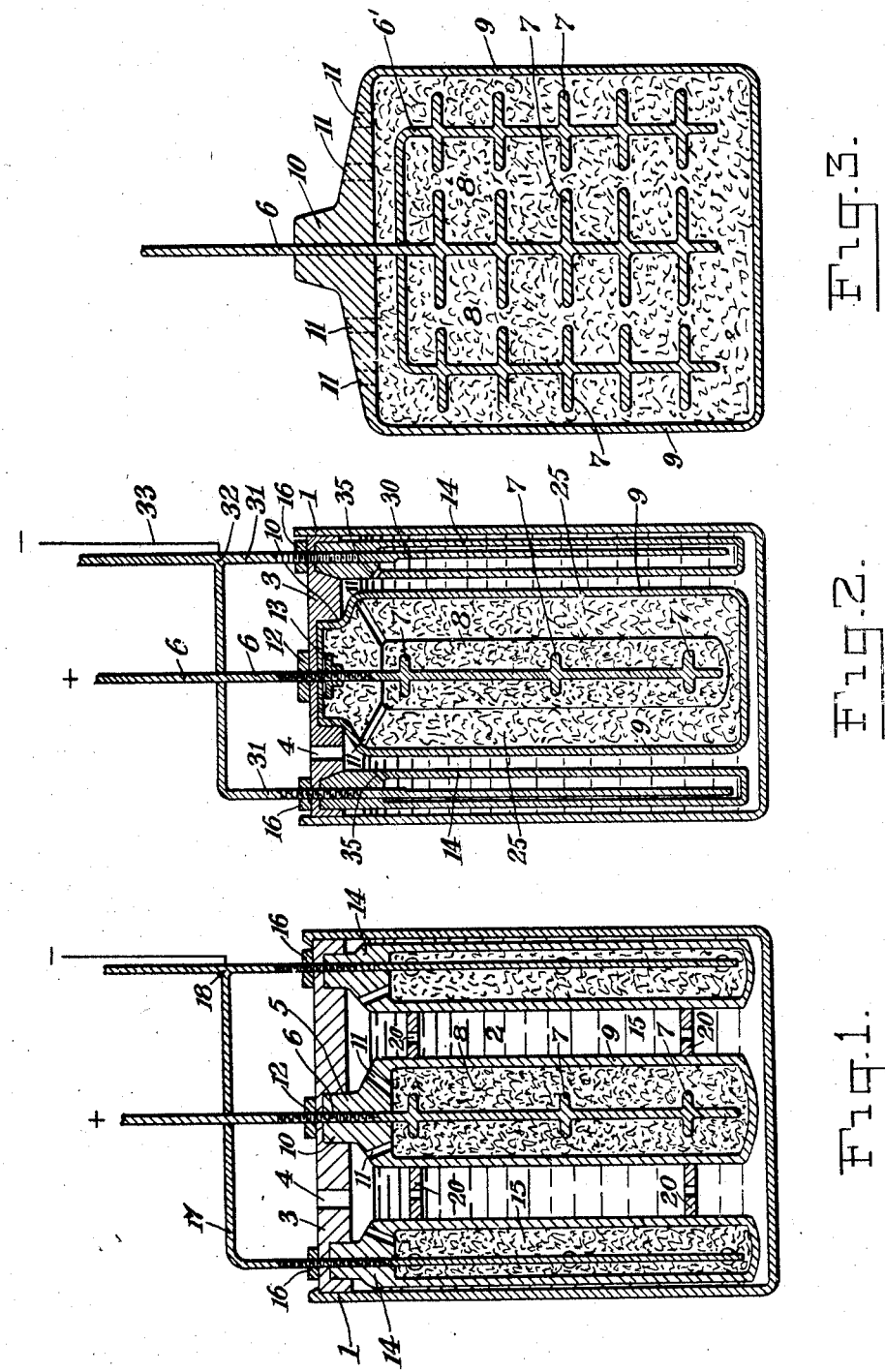

1,590,605

UNITED STATES PATENT OFFICE.

EDWIN TAYLOR, OF BROOKLYN, NEW YORK, ASSIGNOR TO TAYLOR LABORATORIES, INC., OF NEW YORK, N. Y., A CORPORATION OF NEW YORK.

ELECTRIC-BATTERY CONSTRUCTION.

Application filed June 21, 1924. Serial No. 721,379.

My invention relates to improvements in electric battery construction and is especially applicable to storage batteries or cells. The main object of the invention is to provide an efficient battery or cell which may be easily and cheaply constructed. Further and more specific objects, features and advantages will more clearly appear from the detailed description below.

According to a preferred form of the invention I make a solution of cellulose by dissolving cotton or other cellulosic material in a cupro-ammonia solution or nickel ammonia solution or both. The solution is preferably made quite concentrated with cellulose. I then preferably expose the cellulose solution to the atmosphere with continued stirring or agitation to evaporate the same down until the hydrosol activity is reduced to a point where the hydrogel state begins, that is, until the solution begins to stiffen up like a jelly as described in copending application Ser. No. 415,468 filed Oct. 8, 1920.

At this juncture any desired amount of a metallic oxide or peroxide say of lead or manganese in a state of fine division is intimately mixed with the thickening cellulose mass, being held partly in solution and partly in suspension depending on the oxide used and the amount added and prevented from settling by its viscosity. The mixture is now poured or tamped into a frame or mould of the required dimensions with a grid of antimony lead therein.

The formed plate or body of the cellulose solution with the grid therein may be now placed against a permeable membrane in an electrolytic cell substantially as described in said application Ser. No. 415468, and containing ammonium nitrate as electrolyte or conducting liquid. It is placed between a copper anode and a carbon cathode of the cell and on the cathode side of the permeable membrane.

One or more wires of platinum or other non-oxidizable metal may be connected to the grid so that they may serve the purpose of an electrical connection to the cellulose-metal-peroxide plate after the same is formed.

The current being turned on the copper or nickel or both in the cellulose solution is withdrawn electrolytically and electro-deposited on the cathode and the ammonia is set free and may be recovered for re-use.

The cellulose and metallic oxide, the latter with its oxygen content increased are simultaneously deposited or held against the permeable membrane and around the grid. The current is continued at rather high density to insure porosity of the cellulose body until the cellulose-metallic oxide mass is substantially free of copper or nickel or both. Then the formed plate is removed from the cell. If any solution metal still remains in cellulose-oxide plate it may be again subjected to similar electrolytic action to remove the same. The plate is now suspended by its wire connection in a cupro-ammonia-cellulose solution and caused to become an anode by the passage of a current through its connection to suitable cathodes surrounding it in any suitable manner such as that disclosed in copending application Ser. No. 415,468 filed Oct. 8, 1920. The current density is kept comparatively low and both plate and connection become uniformly covered with a tough, elastic coating or bag of pure cellulose.

A series of holes are now punched through what is to be the upper edge of this bag, to the active material beneath. The perforated edge of the plate is now pressed into a mould provided with a series of tubes with tapered ends, corresponding in number and position with the holes in the bag. A liquid, water for instance, is now forced through these tubes thereby distending the elastic covering or bag and stripping it from the cellulose-metal-peroxide mass beneath. The adhesion between the two materials being but slight at best, a comparatively low pressure, about 2 lbs. per sq. in. is sufficient. The cellulose deposit about the wire connection adheres much more firmly to the metal and in addition is held in position by the mould so that the connection still remains embedded in the cellulose-oxide body. This loosening of the bag and the holes through its upper edge provide means for the escape of gas which may be evolved during charging, etc. when the plate becomes part of a battery. The plate is now removed from the mould, the liquid ejected by the elasticity of the bag, which while it never adheres to the mass beneath still grips it firmly. The covered plate is now placed between electrodes, preferably two cellulose-membrane cells one serving as an anode and the other as a cathode, in an acid electrolyte and submitted to osmosis and electrolysis until the last trace of solution-metal has been removed, or the plate itself may be made the anode and current passed through it to suitable cathodes thereby tending to remove the solution-metal and peroxidize the metal which forms the active material, at the same time.

The mould or frame in which the cellulose-metallic oxide mass is deposited may contain a multiplicity of conducting wires or "grids" around its sides and the material deposited about them in a sheet or plate of desired dimensions, the sheet being later cut into plates in such a manner that each individual plate may contain conductor wires or "grids" embedded in it.

In place of embedding the "grids" in the cellulose metallic-oxide mass as above, the "grid" may be made an anode in a cellulose solution containing metallic salts or hydrates capable of depositing as oxides at the positive pole, and both cellulose and oxide deposited simultaneously, the solution-metal in the meantime passing to suitable cathodes. This arrangement itself constitutes a battery, since it will generate a current if disconnected from the charging current. If for instance cellulose be dissolved in zinc chloride and lead chloride or hydrate added, a grid serving as an anode immersed in the solution and a current passed to a suitable cathode say a zinc plate, cellulose admixed with lead peroxide will deposit on the grid, metallic zinc on the zinc plate and hydrochloric acid form in the solution. A commercial battery may be thus constructed, particularly if the positive plate be thoroughly freed from all traces of chlorine by osmosis and electrolysis and the hydrochloric acid replaced by dilute sulphuric acid. The same holds true for cellulose dissolved in cupro-ammonia to which lead hydrate for instance has been added.

In place of electro-depositing the cellulose envelope or bag on the plate approximately the same result may be obtained by forming thereon an undisrupted colloid film of any organic material silk for instance, by any of the previously described methods.

The plates obtained as just described are positive plates. For negative plates several methods are available. Not too finely divided metal, lead, zinc, etc., preferably chemically pure may be mixed with a hydrosol solution of cellulose, silk, etc., and flowed into suitable moulds containing connection wires or "grids" as before; and the mixture allowed to coalesce and harden by suitable evaporation methods. The plates are now placed between electrodes and the solution-metals removed by osmosis and electrolysis. This is readily done in the case where lead is used as the negative metal, but where zinc, copper, etc., are to be employed, large amounts of these metals pass over to the cathode of the removal cell. This necessitates the use of these metals in rather a coarse state of division though the resulting plate may be made very porous and a minimum weight of metal be required for a given electrical output. As a second alternative, solid or perforated sheets of the desired metal may be employed. Although it is evident that either the cellulose embedded type or the plain sheets might be used in conjunction with the described positive plates without the use of separators, the cellulose covering of the positive being usually sufficient, it is preferred to cover both with a bag of pure cellulose, gas vented, as by this means local action, short circuiting, etc., are reduced to a minimum while on open circuit, and lead and zinc "trees" entirely eliminated during charging.

Mention may be made at this point of the difference between the cellulose envelopes formed by these processes and porous jars, blotting paper, perforated celluloid, and the like commonly used in batteries. They may be considered merely as screens, the meshes of which have been made as fine as possible by mechanical subdivision. With these cellulose films or envelopes however, the action is a physical one. The cellulose envelope is a colloid in a state of "solid solution" and is non-cellular and non-fibrous in form. Diffusion of liquids or solids through them is slow unless means are provided for ionic discharge of the fluids surrounding them when the action becomes far more rapid. It is this difference in the rate of diffusion which among other things makes this material so valuable from a battery standpoint. On open circuit the positive and negative plates become almost immediately surrounded by an electrolyte of equal density throughout and potential differences between the various parts of the plate are neutralized and the balance maintained until ionic discharge begins upon closing the circuit.

Where a lead battery throughout is desired such as may be required for heavy duty, the negative plates are obtained by placing positives constructed as before, between two anodes and passing a current until all the oxidized or peroxidized lead is reduced to the metallic state. This results in an extremely porous negative plate, in ideal condition to oxidize during discharge without buckling, etc. Negative or positive end-plates having the bulk of the active material on one side are made by similar methods but the moulds in which they are formed are shallower and the connecting wires or "grids" are placed just above the bottom instead of midway of the mould leaving the active material much thicker on the active side.

In the accompanying drawings forming part of this specification:

Fig. 1 represents a longitudinal section of a three plate lead-peroxide battery.

Fig. 2 is a longitudinal section of a lead-peroxide-zinc battery with perforated zinc negatives and cellulose filling.

Fig. 3 is a section taken at right angles to Fig. 1 and Fig. 2 and showing one form battery plate.

Referring to Fig. 1, numeral 1 represents a battery jar of any accepted material, glass, hard rubber, etc., or preferably of pure cellulose either electro-deposited by methods described in copending application Ser. No. 314,102, filed July 29, 1919, or otherwise formed and rendered waterproof by methods to be described later. This jar is partially filled with a standard electrolyte 2, say dilute sulphuric acid, and is covered with a lid 3, through which passes any approved gas vent 4. The lid is preferably made of the same material as the jar. The lid is provided on its under side with a series of tapered cavities adapted to receive necks or protuberances of the cellulose bags surrounding the various plates. In this construction, a positive plate, 5 occupies a central position in the cell. This plate is composed of a central supporting and conducting wire or grid 6, fitted with a series of laterally extending projections 7, 7, 7, cast on or welded to it. The wire or grid 6 is embedded in a mass 8 of non-fibrous cellulose in which has been incorporated any desired amount of divided metal or the oxides or salts of any metal capable of existing on an anode in a peroxidized state, the whole mass having been deposited about the wire or grid 6, by electrolytic action as above described. The active material in the mass 8, is put in a peroxidized condition and constitutes the positive element of the battery. Surrounding this mass is the covering or bag 9 of non-fibrous relatively tough cellulose or other permeable colloid membrane. This bag terminates in a tapered neck 10, adapted to fit the central cavity in the lid 3 and is also provided with a series of holes 11, 11, extending through the bag to the active material 8, and serving to vent any gas released between the active material and the bag. The whole plate may be held in position by means of a nut 12, working on a thread on the connection terminal 6, by which means the tapered neck of the bag 9, is firmly compressed in the cavity or recess in lid 3.

The negative plates 14, 14, are similar in construction to the positive plate, but the ones shown are end plates and consequently may have the bulk of their active material 15, on the side toward the positive plate 5. The mass 15, on these plates may be considered as a finely divided metal embedded in cellulose as previously described. They may also be held in position by nuts 16, 16 working on screw threads on the conductor terminals 17, and these conductors may be suitably joined as at 18, from which point runs a single lead 19 forming the negative pole of the battery. Perforated strips or plates 20, 20 of colloid material produced by the electro-deposition of cellulose and rendered impermeable if desired, may surround the positive plate 5, and aid in holding it and its adjacent plates in position. While the battery shown above contains three plates or electrodes, it is evident that any number may be used as in present types of batteries.

Fig. 2 shows a cell adapted to confine the electrolyte and limit the loss of the same by splashing or otherwise. It also shows one method of using perforated metallic plates. A jar or cell 1, preferably of tough non-fibrous cellulose, is covered with a lid 3, provided with suitable tapered recesses on its under side and a gas vent 4. The positive plate occupies a central position in the cell as in Fig. 1. Its conducting grid 6, is provided with lateral projections 7, 7, 7 as before as well as a lug 13 near its upper extremity. This grid is embedded in a mass of the non-fibrous cellulose and peroxidized metal electro-deposited or otherwise, formed about the grid. As in the previous case, this material is deprived of any trace of solution metal by osmosis with or without actual electrolysis. In place of directly covering the active mass with a layer of elastic cellulose, the conductor and the active mass are immersed in say a cellulose-cupro-ammonia solution and current passed through it at a high current density to surrounding cathodes whereby cellulose in a highly porous and soft non-fibrous condition may be deposited to any desired depth over the mass as shown at 25. The partially formed plate is next immersed in dilute surphuric acid and current passed through it to suitable cathodes until all traces of solution metal are removed and the spongy cellulose is saturated with dilute sulphuric acid. The plate with its contained acid may now be again immersed in cellulose-cupro-ammonia and a current of low density passed until a coating 9 of tough elastic non-fibrous cellulose has been deposited over the whole when the plate is removed from the cellulose solution and again treated to remove metallic solution constituents. The vent holes 11, 11, may now be made through both envelope or bag 9, and the porous cellulose mass 25 to the active material 8, and the porous cellulose separated from the active material 8 by forcing dilute sulphuric acid through the vent holes. The finished positive plate may now be clamped to the lid 3, of the cell by means of the nut 12 and the lug 13, on conductor 6. It is apparent that negative plates may be made by discharging positive plates between electrodes as in case 1. The construction shown in Fig. 2, however, illustrates the use of metallic plates of zinc, as by this means the E.M.F. may be raised and the current output largely increased per pound weight of battery.

Flat plates of chemically pure zinc 30, preferably perforated with numerous holes are electrically welded to zinc terminal rods 31. The plates may now be immersed in cellulose solution, either in cupro-ammonia or in zinc chloride, and covered with a non-fibrous relatively tough cellulose envelope 14, 14, by electro-deposition, using a low tension current and a low current density in order to keep the amount of zinc carried over to the cathode as low as possible, or the plates may be cellulose covered by any of the above methods, the solution metals being removed by osmosis with or without actual electrolysis. As before, vent holes 35, 35, are provided and the space between plate and envelope filled with dilute sulphuric acid. The plates are now fastened to the lid 3, by the nuts 16, 16 on the conductors 31, 31 and the conductors brought to a joint 32, from which runs a terminal lead 33, constituting the negative pole of the battery. Dilute sulphuric acid may now be added to the cell through vent hole 4 and the electrolyte brought to any required level. The thickness of porous cellulose 25, surrounding the positive mass 8 or when used about plates 30, or about both positive and negative plates, if required, should be so calculated that only a minimum of electrolyte need be added to fill the cell. By this construction an extremely light, high-powered battery well adapted to portable or traction uses may be obtained, the increase in internal resistance due to the use of a spongy cellulose being offset by the increased E. M. F. due to the use of metallic zinc.

Fig. 3 shows one form of plate positive or negative suitable for the lead-lead peroxide type. The terminal conductor 6, has fastened to it L-shaped members 6', 6', and both conductor and members are provided with a number of laterally extending projections 7, 7, 7, the whole constituting a grid embedded in the cellulose-peroxidized metal mass 8. Both mass and electrode are surrounded by an elastic permeable membrane 9, of cellulose, the cellulose membrane terminating in a tapered projection of cellulose 10, capable of acting as a stopper or plug and firmly deposited on conductor 6. The vent holes 11, 11, through the envelope are indicated by dotted lines.

Batteries made by the above methods are characterized by their extremely light weight and great capacity. This is directly due to the fact that the active material is held in suspension as it were, in an elastic, inert, but electrically conductive medium, that is, spongy or permeable cellulose saturated with an electrolyte. The active material is free to expand and contract on charge and discharge but carries the cellulose with it as it does so, thereby preventing the buckling of plates or falling off of active material which is the bane of the rigid plate batteries. Again owing to this porosity practically all of the lead or other salts or oxides are electrically effective instead of only from 15 to 20% as in present types. The supporting grid of the present type weighing more than the active material it carries is done away with and the lightest grid or conductor that will suffice to carry the current is substituted. Weight reduction is enhanced by the ability to use metallic zinc in place of lead for the negatives without the difficulties previously experienced from local action, internal short-circuiting, etc. This is due to the fact that the plates, negative or positive, are covered with a layer of cellulose through which osmosis or diffusion is slow when on open circuit. The amount of electrolyte in contact with any plate say a zinc negative is very small, soon becomes saturated with zinc salts and tends to reach a neutral position with no further action. When the circuit is closed however, ionization is rapid and osmosis of the zinc or lead through the cellulose walls greatly increased. The saving in weight by the use of zinc is best illustrated by the fact that the electric equivalent of zinc is approximately 4 to 1 compared to lead.

Owing to the small amount of mechanical work necessary on grids, moulds, etc., and the inexpensive materials used, those batteries are far cheaper to produce than any others and the outlay for plant for a given capacity almost negligible.

An important feature, is the ability to withstand a heavy discharge rate without injury to the plates partly due to their elastic nature and partly to the resistance of the cellulose envelopes to an undue passage of current. These envelopes offer but small resistance to a normal discharge rate but this resistance runs up rapidly at a point much above normal, producing a throttling effect on the current. For this reason, it is preferred to employ rather light conductors from cell to cell in place of the heavy ones now used so that these may "blow" in event of a short circuit across the terminals and the damage done be external to the cell, where it may be readily repaired.

While I have described my improvements in great detail and with respect to certain preferred forms I do not desire to be limited thereto, since many changes and modifications may be made and the improvements embodied in widely different forms without departing from the spirit and scope thereof in their broader aspects; hence I desire to cover all modifications and forms coming within the language or scope of any one or more of the appended claims.

What I claim as new and desire to secure by Letters Patent, is:

1. An electric battery cell having positive and negative electrodes comprising non-fibrous cellulose with active materials disseminated therein.

2. An electric battery cell having a positive electrode comprising non-fibrous cellulose with the active material therein.

3. A battery electrode comprising non-fibrous cellulose with active material disseminated therein.

4. A battery electrode comprising a conducting element carrying a body of non-fibrous cellulose with active material embodied therein and a relatively tough and elastic envelope of non-fibrous cellulose substantially surrounding said body.

5. A battery electrode comprising a conducting element carrying a body of non-fibrous cellulose with metallic oxide active material disseminated therein.

6. A battery electrode comprising an active element substantially surrounded by an envelope of cellulose, said cellulose envelope being tough, elastic, and non-fibrous.

7. A battery electrode comprising a body of cellulose with active material disseminated therein and an envelope of cellulose substantially surrounding said body, said cellulose envelope being relatively tough.

8. A battery electrode comprising a conducting element carrying a body of non-fibrous cellulose with active material embodied therein and a layer of non-fibrous cellulose substantially surrounding said body.

9. A battery electrode comprising an active element substantially surrounded by a layer of cellulose carried by the element, said cellulose being non-fibrous and non-cellular.

10. A battery electrode comprising a conducting element carrying a body of non-cellular cellulose with active material disseminated therein, a layer of relatively soft non-fibrous cellulose substantially surrounding said body, a layer of relatively tough non-fibrous cellulose substantially surrounding said soft cellulose.

11. A battery electrode having its active element substantially surrounded by a bag of non-fibrous cellulose.

12. A battery electrode having its active element substantially surrounded by a bag of non-fibrous cellulose, said bag being apertured for the escape of gases.

13. A battery electrode comprising a conducting element carrying a body of non-fibrous cellulose with a lead oxide dispersed therein.

14. A battery electrode comprising a conducting element carrying a body of non-fibrous cellulose with a lead oxide dispersed therein, and substantially surrounded by a bag of cellulose.

15. A battery cell comprising a container of non-fibrous cellulose and electrodes therein having the active material thereof substantially enclosed with layers of cellulose.

16. In the method of making a battery electrode the steps which consist in making a solution of cellulose, mixing therewith active material forming substance, and applying the mixture to a conducting element.

17. In the method of making a battery electrode the steps which consist in making a solution of cellulose, mixing therewith active material forming substance, and applying the mixture to a conducting element, and electro-depositing a layer of non-fibrous cellulose on the element.

18. In the method of making a battery electrode the steps which consist in making a solution of cellulose, mixing therewith active material forming substance, removing solvent constituents from the cellulose mixture, and applying the mixture to a conducting element, and electro-depositing a layer of non-fibrous cellulose on the element.

19. In the method of making a battery electrode the steps which consist in making a solution of cellulose, mixing therewith an active material forming substance, applying the mixture to a conducting element, and subjecting the mixture to electrolytic action to withdraw solvent constituent therefrom.

20. In the method of making a battery electrode the steps which consist in making a solution of cellulose, mixing therewith an active material forming substance, and subjecting the mixture to electrolytic action to withdraw solvent constituent therefrom.

In testimony whereof I have signed my name to this specification.

EDWIN TAYLOR.